United States Patent
Schaufelberger et al.

(10) Patent No.: US 11,305,479 B2
(45) Date of Patent: Apr. 19, 2022

(54) CARTRIDGE HAVING COMPOSITE MATERIAL

(71) Applicants: Coltène/Whaledent AG, Altstätten (CH); regenHU AG, Villaz-St-Pierre (CH)

(72) Inventors: Martin Schaufelberger, Weesen (CH); Simon Sutter Menghini, Chur (CH); Werner Barth, Elgg (CH); Michael Kuster, Liebefeld (CH); Marc Thurner, Wavre (CH)

(73) Assignees: COLTÈNE/WHALEDENT AG, Altstätten (CH); regenHU AG, Villaz-St. Pierre (CH)

( * ) Notice: Subject to any disclaimer, the term of this patent is extended or adjusted under 35 U.S.C. 154(b) by 550 days.

(21) Appl. No.: 15/569,099

(22) PCT Filed: Mar. 7, 2016

(86) PCT No.: PCT/EP2016/054750
§ 371 (c)(1),
(2) Date: Oct. 25, 2017

(87) PCT Pub. No.: WO2016/142323
PCT Pub. Date: Sep. 15, 2016

(65) Prior Publication Data
US 2018/0111316 A1    Apr. 26, 2018

(30) Foreign Application Priority Data
Mar. 6, 2015  (EP) ..................................... 15158023

(51) Int. Cl.
*B33Y 40/00*  (2020.01)
*B29C 64/209*  (2017.01)
(Continued)

(52) U.S. Cl.
CPC ........ *B29C 64/106* (2017.08); *B29C 35/0805* (2013.01); *B29C 64/112* (2017.08);
(Continued)

(58) Field of Classification Search
CPC ..... B29C 64/20; B29C 64/209; B29C 64/112; B33Y 10/00; B33Y 40/00
(Continued)

(56) References Cited

U.S. PATENT DOCUMENTS

| 6,942,830 B2 * | 9/2005 | Mulhaupt | ............. | B29C 31/045 264/255 |
| 7,996,101 B2 * | 8/2011 | Menchik | ................ | B33Y 40/00 700/119 |

(Continued)

FOREIGN PATENT DOCUMENTS

| CA | 2 371 357 A1 | 9/2002 |
| CA | 2 375 889 A1 | 9/2002 |

(Continued)

OTHER PUBLICATIONS

English Translation of Ikuta (WO2005084581) (Year: 2005).*
(Continued)

*Primary Examiner* — Matthew J Daniels
*Assistant Examiner* — Hana C Page
(74) *Attorney, Agent, or Firm* — Finch & Maloney, PLLC; Michael J. Bujold; Jay S. Franklin

(57) ABSTRACT

A cartridge (1) for a 3D printer, wherein the cartridge (1) has a nozzle or is designed in such a way that a predefined nozzle can be formed in the cartridge (1). The cartridge (1) contains a dental composite material, and the dental composite material comprises a curable, in particular a light-hardenable, matrix and only fillers having a maximum particle size of <5 μm. The dental composite material has a viscosity, in a
(Continued)

Figure 1:
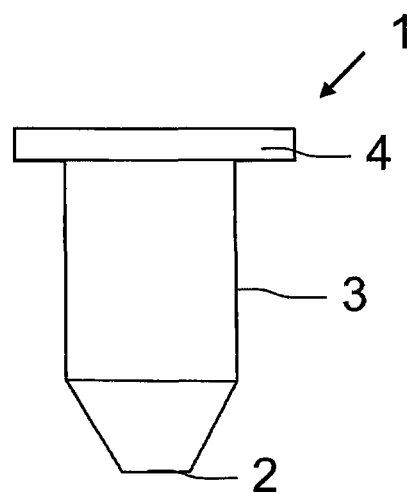

non-cured state, in the range of 1 to 10,000 Pa*s, preferably 10 to 2,000 Pa*s, more preferably between 50 to 800 Pa*s.

8 Claims, 3 Drawing Sheets

(51) Int. Cl.
  B29C 70/58 (2006.01)
  B33Y 30/00 (2015.01)
  B29C 64/106 (2017.01)
  B33Y 80/00 (2015.01)
  B33Y 70/00 (2020.01)
  B33Y 10/00 (2015.01)
  B29C 64/112 (2017.01)
  B29C 64/259 (2017.01)
  B29C 35/08 (2006.01)
  B29C 70/88 (2006.01)
  B29L 31/00 (2006.01)

(52) U.S. Cl.
  CPC .......... B29C 64/209 (2017.08); B29C 64/259 (2017.08); B29C 70/58 (2013.01); B29C 70/88 (2013.01); B33Y 10/00 (2014.12); B33Y 40/00 (2014.12); B33Y 70/00 (2014.12); B33Y 80/00 (2014.12); B29C 2035/0827 (2013.01); B29L 2031/7536 (2013.01); B33Y 30/00 (2014.12)

(58) Field of Classification Search
  USPC ....................................................... 264/401
  See application file for complete search history.

(56) References Cited

U.S. PATENT DOCUMENTS

2002/0167100 A1  11/2002  Moszner et al.
2010/0140850 A1* 6/2010  Napadensky ......... B29C 64/112
                                                  264/401
2013/0216270 A1* 8/2013  Yamabe ............. G03G 15/0879
                                                  399/258
2014/0167300 A1  6/2014  Lee
2015/0089881 A1* 4/2015  Stevenson ............ C09K 3/1409
                                                  51/309

FOREIGN PATENT DOCUMENTS

| | | |
|---|---|---|
| CA | 2371357 A1 | 9/2002 |
| EP | 1 240 878 A1 | 9/2002 |
| EP | 1 243 231 A2 | 9/2002 |
| JP | 2001139411 | 5/2001 |
| JP | 2012087086 A | 5/2012 |
| WO | 01/78968 A1 | 10/2001 |
| WO | 2005/084581 A1 | 9/2005 |
| WO | 2008131323 A1 | 10/2008 |
| WO | 2012/070052 A1 | 5/2012 |
| WO | 2015/017421 A2 | 2/2015 |

OTHER PUBLICATIONS

English Translation of Kunkel (EP1240878) (Year: 2002).*
"Thermal Conductivity" <http://hyperphysics.phy-astr.gsu.edu/hbase/Tables/thrcn.html> (Year: 2005).*
English Translation of Moszner (EP1243231) (Year: 2002).*
Ozbolat, "Current advances and future perspectives in extrusion-based bioprinting" Biomaterials. 76. Published 2016. pp. 321-343. (Year: 2016).*
International Search Report Corresponding to PCT/EP2016/054750 dated May 25, 2016.
Written Opinion Corresponding to PCT/EP2016/054750 dated May 25, 2016.
International Preliminary Report on Patentability Corresponding to PCT/EP2016/054750 dated Sep. 12, 2017.
Japanese Office Action issued in corresponding Japanese Patent Application No. 2017-564952 dated Feb. 12, 2020.

* cited by examiner

CARTRIDGE HAVING COMPOSITE MATERIAL

The invention relates to a cartridge for a 3D printer, a support material for the 3D printing of dental parts from composite material, and a method for curing composite material and a method for the generative production of dental prosthesis parts.

3D printing generally refers to all production methods which build up a structural component by layerwise accretion of portions of material. Many different 3D printing methods are known today. Some methods use light or lasers in order to solidify geometric structures from a photosensitive resin. These for example include stereolithography (STL) or direct light processing (DLP).

The use of printing heads, such as are similarly used in conventional inkjet printing, is known. In this, photosensitive and low viscosity liquids are deposited layerwise as droplets and cured by irradiation. The methods are for example referred to as Multi Jet Modelling (MJM) or Polyjet Printing (PJP), depending on the manufacturer's equipment.

In one modification thereof, a photosensitive liquid (ink, binder) can be injected into a powder bed in order specifically to adhere powder particles and bind them layerwise into a structural component. One example of this is the so-called ColorJet Printing (CJP). Either the binder itself is colored or binder and color pigments are deposited by means of different nozzles. In other methods, a viscous liquid is extruded as a strand and this is deposited layerwise on a building platform. The material used can be a molten polymer-based material or a paste of a liquid/resin solid mixture. With use of thermoplastic materials, the curing of the component can be effected by phase transformation (solidification) or, with use of resin systems, with photoinitiators by irradiation. Examples are Fused Deposition Modelling (FDM) or 3D plotting.

As a consequence of the layering, the surface roughness is very different depending on the method used. Most methods demand an after-treatment, such as for example the removal of auxiliary material/support material. Depending on the quality of the auxiliary material, this can be effected by melting out, mechanical detachment or sand-blasting or by dissolution in a bath. Other possible after-treatments in the case of photosensitive resins are after-curing with light and/or heat, resin infusion to cover ridges, or varnishing.

For dental applications, various methods are already used today, e.g. SLM for metal frameworks of removable prostheses, MJM for models and drilling templates and STL for temporary prostheses.

However, a disadvantage with the previously described methods is that with 3D printing methods it has not hitherto been possible to produce dental prosthesis parts such as for example bridges, crowns, inlays, onlays and veneers which satisfy the physical, mechanical and chemical properties required in current standards. Furthermore, esthetic aspects are also not as yet achieved thereby.

Moreover, the desired esthetic effect often demands the use of several colors in one component, as a result of which the methods known today with one monomeric starting material are ruled out. In order to achieve the necessary strength and rigidity for accommodating chewing forces that occur, for sufficient abrasion resistance and for a reasonable lifetime of the dental prosthesis, reinforced polymers, also known as composites, must be used.

EP 1 240 878 B1 describes the use of plastic material in the 3D printing of dental prosthesis parts. Decreased blockage of a nozzle in a nozzle array is achieved by means of a screen which shields the nozzle from light of the curing wavelength. Furthermore, the use of a polymerizable plastic which has a viscosity such that the processing of the plastic with the nozzle array can take place in the nonpolymerized state is disclosed.

EP 1 243 231 B1 discloses a method in which highly viscous or filled starting materials are used in 3D printing methods. The deposition of microstrands or microdrops is possible therewith. The reinforcing materials in the form of fibers or particles in general lead to such composites having a high viscosity. However, this leads to comparatively high ejection pressures for the cartridges and nozzles and to blockage of the nozzle by the reinforcing materials. Reliable and inexpensive printing of dental prosthesis materials is thus not possible with the methods described in the state of the art. The exchange of the printing head or the nozzle of the printing head also represents a considerable cost factor.

U.S. 2010/140850 A1 discloses a composition for SFF (solid freeform fabrication) comprising a curable component with a monofunctional methacrylate group, a photoinitiator and a sulfur-containing additive.

U.S. 2002/167100 A1 discloses a method for the production of dental parts which comprises the application of a material onto a solid support or a liquid medium with a layerwise 3D application method.

U.S. 2014/167300 A1 discloses compositions curable with light for artificial teeth and the base of dental prostheses with photocurable organic components, a surface-modified inorganic filler, a photoinitiator, dye and stabilizer.

WO 2005/084581 discloses a medical 3D structure made of a biocompatible, biologically degradable resin and a method for its production. The latter comprises filling a syringe with granules of a biocompatible, biologically degradable resin, melting the resin and forming 2D layers by deposition through a nozzle. Several 2D layers form a 3D structure.

WO 01/78968 A1 discloses a device and a method for producing three-dimensional objects. The device has a container for a medium and a three-dimensionally positionable dispenser for release of a material into the medium. The release of the material into the medium leads to the formation of solid structures. The release of the material by movement of the dispenser in the XYZ direction onto a platform below the fill level of the first material in the container leads to the formation of three-dimensional objects.

WO 2012/070052 A1 discloses a method for additive production of a 3D object. The method comprises the successive formation of several layers to a pattern which corresponds to the shape of the object to be formed. The layers are formed by deposition of at least one modelling material and cured by irradiation.

WO 2015/017421 A1 discloses a method comprising provision of a carrier material in which a structure is produced, deposition of a structural material into the carrier material to produce the structure and removal of the carrier material to release the structure produced.

Hence an objective of the invention is to overcome the disadvantages of the state of the art. In particular it is an objective of the invention to provide a cartridge for a 3D printer, which enables the 3D printing of dental prosthesis parts and in the process brings practical and esthetic advantages. Further aspects of the invention relate to the provision of i) a support material for the photopolymerization of a composite material, ii) a method for curing composite material and iii) a method for the generative production of dental prosthesis parts.

The invention relates to a cartridge for a 3D printer, wherein the cartridge has a nozzle or is designed such that a predefined nozzle is formable, and wherein the cartridge contains a dental composite material. The composite material comprises a curable, in particular photocurable matrix, and only fillers with a maximal particle size of <5 μm. In the uncured state, the dental composite has a viscosity in the range from 1-10,000 Pa·s, preferably from 10-2,000 Pa·s, especially preferably 50-800 Pa·s, in particular according to determination of the viscosity in the rheometer as explained below in the practical examples.

In this manner, blockage of the nozzle during the 3D printing is very largely ruled out, which enables continuous 3D printing. Pausing or stoppage of the printing process to free the nozzle from blockages is thus not necessary. The cartridge according to the invention enables efficient and speedy 3D printing of dental prosthesis parts. The cartridge according to the invention enables inexpensive printing by a dentist (chairside) within a short time, so that a patient can be completely treated in one consultation.

The cartridge can have a size ratio of the nozzle diameter to the greatest particle size of the composite material of 10:1, preferably 30:1, especially preferably 50:1. Here the diameter can lie in the range from 50 to 300 μm, preferably 100 to 250 μm, especially preferably 150 to 200 μm. Through the appropriately selected ratio of cartridge nozzle diameter to greatest particle size of the composite material, blockage and hence stoppage or interruption of the 3D printing is prevented.

Furthermore, the cartridge can be designed such that it contains a quantity of a composite material which essentially suffices for one use (single dose). This has the advantage that for each new construction task and for each material component, a new and clean nozzle is used. In this manner, the process stability is improved. No material entrainment takes place. Cleaning after conclusion of the construction task is not necessary. Accordingly, no composite material residues collect in places which could cure because of the ambient light and could interfere with the printing process in a following task.

The fill quantity of the cartridge can preferably lie in a range from 0.5 grams to 4 grams, for example at 1.5 grams. In the production of dental prosthesis parts by 3D printing from several materials, the quantity for the some materials can optionally be correspondingly smaller.

The cartridge and/or the reservoir region can be made of different materials and be manufactured in different ways. Thus the materials can be selected from the group metal, plastic and combinations of metal and plastic.

Preferred metals are stainless steel, aluminum, or titanium. These have the necessary strength and rigidity, do not react with the composite material, are impermeable to light and can easily be brought into the desired geometric shape with normal technical means and methods.

The cartridge can additionally be coated on the inner sides (of the reservoir/reservoir region) which are in contact with the composite material. Such a coating can for example contain plastic or ceramic or consist thereof. Thus certain properties such as for example the sliding behavior can be advantageously influenced and adjusted.

Preferred plastics are thermoplastic materials, in particular polypropylene (PP), polybutylene terephthalate (PBT), polyamide (PA), polyphthalamide (PPA), polysulfone (PSUP), polyphenylene sulfide (PPS) and polyether ether ketone (PEEK).

A plastic cartridge is inexpensively producible in the necessary piece numbers. The oxygen permeability of the plastic cartridge has a positive effect on the storage life of the composite material. The mechanical stability of the plastic cartridge is sufficient and can be still further optimized with fillers. The light impermeability of the plastic cartridge can be obtained by the addition of color pigments to the plastic during the production of the cartridge.

A cartridge of a combination of metal and plastic is advantageous since a fine and robust nozzle can be formed. For this, a cylindrical or conical metal channel is preferably attached as a nozzle on a plastic cartridge. This can for example be effected by overmolding the metal channel or by inserting, in particular pressing, cementing or welding the metal channel in.

The cartridge can further have a piston for displacing the composite material out of the cartridge through the nozzle. In this manner, the composite material can be pushed out of the cartridge as required and deposited on a target site.

The geometries of the cartridge and the nozzle are preferably designed such that a flow technology optimized material flow of the composite material during the printing process is achieved. In this manner, a high material flow is achieved with low ejection pressure. The flow rate could be increased by the factor 30-50 with a conical nozzle. A typical value for the flow rate with conical nozzle with an end diameter of 0.160 mm is 0.05 g/min, at 5 bar ejection pressure and 23° C.

Especially preferably, the nozzle is conically shaped over a broad region, in particularly over essentially its whole length; only an end region before the outlet is cylindrically shaped. The cylindrical design in the end region serves in particular to set a defined strand diameter. The cylindrical end region of the nozzle preferably has a length from 1 to 30 times, preferably from 3 to 10 times, the internal nozzle diameter at the outlet. Because of the fine shape of the nozzle, this can preferably be provided with a removable cap. The removable cap protects the nozzle from deformation.

The cartridge can have a positioning device which ensures defined and reproducible mounting of the cartridge in a 3D printer. Defined mounting is of use particularly with the use of several cartridges of different content during the production of a dental prosthetic part, to avoid an undesired misalignment between the materials. The positioning device can for example be formed by a conical or truncated cone-shaped centering element which is located around the nozzle. The positioning device can further have a stop to ensure a defined position of the nozzle outlet along the nozzle longitudinal axis. A printing head of a 3D printer, designed to accommodate the cartridge, can have an opposite positioning device corresponding to the positioning element.

The cartridge can also have a sieve which is positioned before the outlet of the nozzle. If the composite material is displaced from the cartridge, then this is passed through the sieve. Here the sieve is positioned in the interior of the cartridge in order to filter the composite material before it reaches the nozzle. In this manner, agglomerates of filler particles which may have formed in the cartridge are kept away from the nozzle and blockage of the nozzle is prevented. The sieve can have a pore size in the range from 5 to 1000 μm, preferably 10 to 500 μm, especially preferably 20 to 100 μm. Thus the system of nozzle opening diameter, maximum filler particle size and sieve pore size can be adjusted such that efficient 3D printing of dental prosthesis parts is enabled.

Furthermore, the cartridge can have a cover which generally protects the contents of the cartridge from the surroundings. In particular, by means of such a cover an unintentional actuation of the piston for displacing the composite material can be excluded.

The cartridge can be designed such that a nozzle can be formed by cutting or by puncturing, in particular by means of a laser. In this manner, a nozzle or a nozzle opening with a size defined according to requirement can be provided.

Furthermore, the cartridge can have a least one sealing element. Here the sealing element is designed such that the cartridge is sealable against a pressurizing element positionable on the cartridge for displacing the composite material. Such a pressurizing element can be designed for acting on the piston. In particular, the pressurizing element can be a compressed air-operated, hydraulic or mechanical pressurizing element which can be positioned on the cartridge. The sealing element can be a seal in the form of an O-ring, for example of a deformable material. Likewise, a sealing action can be obtained by an indentation on the cartridge. In this, the material of the pressing stamp is harder compared to the material of the cartridge, as a result of which an indentation and thereby a sealing action on the cartridge is obtained. In principle, the reverse material properties are also possible, but less preferred.

The at least one sealing element can be positioned on an external region of the cartridge, preferably on an upper cover. Alternatively, it can be positioned in an inner region of the cartridge above the pressurizing element, which borders on a reservoir region. Here the reservoir region contains the composite material. In this manner, an efficient sealing of the inner region of the cartridge against the surroundings is obtained and thereby a controlled deposition of composite material from the cartridge through the nozzle.

The cartridge comprises a wall completely surrounding the reservoir. In the operating condition, the nozzle or the nozzle opening can be positioned below the wall of the reservoir. The surrounding wall thus forms a mounting for the piston. This wall can be cylindrically shaped. Alternatively, the wall can have a skirting ledge, for example for accommodating a sealing element, in particular an O-ring. In principle, the sealing element can also be positioned without a skirting ledge, in an internal region, for example in an upper region of the cartridge in the operating condition or in a region of the upper boundary of the cartridge. The wall of the cartridge can also have two functionally different regions. Here a first region is designed to accommodate the pressurizing element, in particular a compressed air connector, for moving the piston and to accommodate the sealing element. The second region here at least partially forms the reservoir for accommodating the composite material and the piston. In this manner, in the operating condition an advantageous sealing of the cartridge against the surroundings can be obtained.

The cartridge and the at least one sealing element can be produced by coextrusion or by deep drawing processes. Alternatively, the at least one sealing element can also be produced by spraying onto the ready-made cartridge.

The cartridge can be designed in such a manner that the cartridge is positionable positively locking in or on a corresponding unit of a 3D printer. This can preferably be achieved via a guide device in the form of a recess or a projection, wherein an essentially complementary recess or projection is present on the 3D printer. In this way, incorrect use in the sense of insertion and use of an unsuitable cartridge is excluded.

The cartridge can have a thermal conductivity from 0.1 to 400 W/mK, preferably 0.2 to 250 W/mK, especially preferably 70 to 250 W/mK. In this manner, an efficient heat input to the cartridge can take place from a heating unit which is positioned in or on the unit of the 3D printer corresponding to the cartridge. By means of the heat input, the flow properties of the composite material in the cartridge can be adjusted optimally or according to requirements. The processing of the composite material and optionally of further materials, such as support material and/or a parting material as described below at a defined temperature, preferably a defined temperature set by means of a heating unit, further ensures defined and reproducible properties of the respective materials.

A further aspect of the invention relates to a support material for the 3D printing of dental parts from composite material as previously explained. The support material can be designed such that it is essentially impermeable to oxygen and in particular biocompatible. Here and below, biocompatible is understood to mean the property that a material has no adverse influence on living beings according to ISO 10993 1-20:2009. In this manner, the support material can be used in 3D printing in the production of in particular medical and dental prosthetic parts in 3D printing. Because of the impermeability to oxygen, deposited composite material onto which the support material according to the invention is deposited is shielded from ambient oxygen.

Alternatively or in addition to the aforesaid impermeability to oxygen, the support material can be essentially permeable for electromagnetic radiation in the wavelength range from 100 to 1000 nm, preferably 200 to 800 nm, especially preferably 300 to 500 nm. In this manner, curing of the composite material can be effected through one or more superimposed layers of the support material. In addition, the previously explained impermeability of the support material to oxygen makes it possible for the outermost layer of the composite material to be cured if this support material is superimposed, since the composite material is not in contact with ambient oxygen.

The support material can be designed such that it does not react with the composite material used. Thus in order to ensure optimal detachability the support material is designed such that the support material can form no irreversible chemical bonds with the composite material.

The support material can be designed such that after curing it is elastically deformable. This can be achieved via a lower crosslinking density compared to the composite material.

The support material is designed such that it does not bond with the composite material and essentially does not adhere to it.

The support material may be non-curable or curable. A non-curable support material is preferably a stable, thixotropic paste, for example a gel of glycerin and pyrogenic silicic acid; or a thermoplastic elastomer applicable in the molten state with a melting point of <150° C., preferably <120° C., especially preferably <90° C.

Preferred thermoplastic elastomers are thermoplastic copolyamides (TPA), thermoplastic polyester elastomers (TPE), thermoplastic polyurethanes (TPU), copolyamides (CoPA), copolyester elastomers (CoPE) and polyvinyl alcohol (PVOH).

Curable support material contains a moisture-curing material, for example silicones, or a material curable with irradiation/light, preferably in the UV range. Here the support material can be designed such that it is curable with the same wavelength as the composite material. Preferred curable materials of the support material are based on silicones, urethanes or acrylates.

After use during the printing, the support material can be removed depending on the support material used. For example support materials of water-soluble, stable pastes such as for example gels of glycerin and pyrogenic silicic acid can be washed off.

Support material based on thermoplastic elastomers or weakly crosslinked materials can for removal be dissolved in a suitable polar or non-polar solvent. It is however also possible that the support material only swells in the solvent; it can then subsequently be removed manually with little effort, in particular by peeling off.

It is also possible that in particular elastic and/or friable support material is removed with little use of force and thus gently, in particular by peeling.

Combinations of the aforesaid possibilities for the removal of the support material can be used. With the possibilities described above for the removal of the support material from the composite material, the printed composite material is not altered or destroyed.

Particularly advantageously, the support material is colored in order to ensure a simple visual check of complete removal. A user recognizes when the support material was not removed since the remaining support material is visually conspicuous.

The support material can be selected from the list consisting of polystyrene, polyphenyl sulfone, wax, water-soluble polymers, in particular acrylate copolymers or polyvinyl alcohols, flexible gel-like masses, in particular silicones or polyurethanes, and water-soluble stable gel.

Further advantageous properties of the support material are described below.

i) Temperature Dependence

The support material can advantageously be designed such that the material properties, in particular the viscosity, do not substantially change in the temperature range between 20 and 60° C. It has been found especially advantageous if the temperature dependence of the viscosity of the support material in particular in said temperature range essentially behaves the same as the temperature dependence of the viscosity of the composite material. Further, it is preferable if the support material is essentially thermally stable up to 90° C., that is neither separates nor decomposes nor cures spontaneously (for example without UV activation).

ii) Viscosity

Furthermore, the support material can advantageously be designed such that in the non-cured state it has a viscosity as previously stated for the composite material.

iii) Permeability to Light

The support material can advantageously be designed such that it has a translucency of >30%, preferably >80%, at a layer thickness of 1 mm at a wavelength of 100 to 1000 nm, preferably 200 to 800 nm, especially preferably 300 to 500 nm.

iv) Oxygen Permeability

The support material can also advantageously be designed such that it has an oxygen permeability of <1000 cm$^3$/(m$^2$ d bar), preferably <10 cm$^3$/(m$^2$ d bar).

v) Solubility

The support material can also advantageously be designed such that it is preferably at room temperature soluble in polar solvents, in particular in water. Here the support material preferably dissolves within a few minutes.

vi) Mechanical Values

The tensile strength of the support material after application onto the composite material can advantageously be greater than 5 MPa and is also greater than the adhesion to the composite material. In this manner, the support material can be removed, in particular pulled off, in one piece.

vii) E Modulus

The E modulus of the support material is flexible and can be pulled off on one piece even in the region of undercuts. Here the support material can have a Shore hardness A of <50, preferably <40.

Furthermore, an additional auxiliary material can also preferably be provided, for example in the form of a parting agent. The parting agent can be positioned as a thin layer between composite material and support material. In this manner, the same composite can be used as the base for the composite material and the support material. Because of the interposed parting agent, the composite material and the support material do not bond.

Preferably, the parting agent is applied layerwise as a stable paste and as a single strand onto the previously deposited composite material. Here the layer thickness of the strand can be in the range from 50 to 600 μm, preferably 80 to 300 μm, especially preferably 180 to 200 μm. A particularly high surface quality is thus obtained. If the parting agent additionally forms an oxygen barrier, it can also be used for prevention of an inhibition layer. The parting agent does not crosslink with the composite material and the support material. A preferred parting agent is a paste of glycerin thickened with pyrogenic silicic acid. Also suitable are pastes based on paraffin oil, vaseline or silicone oil. With these alternatives, however, reliable and complete removal is necessary, since during the insertion of the restoration they can impair the adhesion of the adhesive system.

Support material and parting agent and/or other auxiliary agents can be provided in the same manner as previously described for a composite material, in appropriate cartridges, e.g. respectively a support material cartridge and an auxiliary agent cartridge, which likewise have a nozzle or are designed such that a predefined nozzle can be formed. The cartridges can likewise have previously described elements such as seals, piston, sieve and positioning devices.

A further aspect of the invention relates to a method for curing at least one composite material comprising the steps: provision of a composite material to be cured, preferably by means of an additive process, especially preferably by 3D printing; partial or complete coating of the composite material with a support material as previously explained, curing of the composite material with electromagnetic radiation with a wavelength in the range from 100 to 1000 nm, preferably 200 to 800 nm, especially preferably 300 to 500 nm, for which the support material is essentially transparent, and removal of the support material. In this manner, a method is provided whereby complete curing of all layers of the composite material is possible. In conventional methods, the outermost layer of the composite material, which itself forms a kind of oxygen barrier, does not cure and must be removed after the curing of the underlying layers. In the method according to the invention, the applied support material forms the oxygen barrier. Thus for the 3D printing no excess composite material, which would then have to be removed, has to be applied.

Of course, one composite material or several composite materials which differ in particular in their composition such as for example enamel compound, dentine compound and effect color, can be provided for the method according to the invention.

The terms "surround" or "coat" relate to the geometric form of the dental prosthesis part produced or to an some layer after its production, so that the support material partly or completely surrounds the dental prosthesis part or the layer in the form of a shell. However, it does not imply any defined sequential order in the production or the printing of the some layers.

Thus for example dentine compound and enamel compound can be provided as different with different mechanical properties and/or different optical properties for a desired tooth color and translucency. Several cartridges can be provided either separately and for separate mounting in the printing head of a 3D printer, wherein the printing head has corresponding mountings. Alternatively or additionally however, several cartridges can also be combined as one structural unit to give one combi-cartridge.

A further aspect of the invention relates to a method for generative production, in particular 3D printing, of dental prosthesis parts. The method comprises the step of ejecting and curing composite material from at least one cartridge in such a manner that a dental prosthesis part is formed. In this, the cartridge is designed as previously described. In this manner, the advantages of the previously described cartridge are exploited in a method for generative production of dental prosthesis parts. Of course, one cartridge or several cartridges, in particular with different contents, can be provided for the method according to the invention. If several cartridges are provided, then these in particular contain different composite materials as previously described. The one cartridge or the several cartridges can be controlled via CAM software.

In particular, the method can comprise the ejection and curing of a dentine composite material and an enamel composite material, wherein the dentine composite material and the enamel composite material have different mechanical and/or optical properties. Here the method comprises a deposition of dentine composite material and enamel composite material such that the enamel composite material at least partly surrounds or coats the dentine composite material.

Furthermore, in the method previously described, a support material can be provided which is designed as previously described. Here the support material is deposited first for supporting complex structures. Accordingly, composite material, which forms the dental prosthesis part, is deposited on the support material first deposited. In this manner, complex structures can formed in the generative method, in particular in 3D printing. The method can comprise the ejection and optional curing of support material from a cartridge.

In particular, the method can comprise deposition of support material in those regions which in the completed dental prosthesis part form recesses, projections or cavities. Thus the method can comprise the deposition and optional curing of support material in a central or middle region of the dental prosthesis part and the subsequent surrounding or coating with composite material, such as dentine composite material and/or enamel composite material. The region of the support material here extends for example up to a base of the dental prosthesis, so that the finished dental prosthesis part has a recess in a central region. After the subsequent removal of the support material as previously described, the cavity serves for mounting the dental prosthesis part, e.g. a crown, onto a tooth implant, a remaining, etc.

In the method modification described above, the building of the dental prosthesis part takes place by 3D printing beginning with the base up to the chewing surface. Also possible is a reverse procedure, in which the building of the dental prosthesis part begins with the chewing surface. In this case, the method comprises deposition and optional curing of support material corresponding to the negative or inverse contour of the chewing surface. This support material serves as a foundation on which composite material is then deposited and cured.

The previously described method can moreover comprise the steps: provision of a support material as previously described, partial or complete coating of the deposited composite material with the support material, and curing the composite material by means of electromagnetic radiation with a wavelength in the range from 100 to 1000 nm, preferably 200 to 800 nm, especially preferably 300 to 500 nm, through the support material. In this manner, a deposited composite material partly or completely coated with support material is advantageously cured in a defined wavelength range, whereby the layer of the composite material adjacent to the support material is also cured. Thus a subsequent material loss, which conventionally occurs with the removal of the outermost, non-cured composite material layer, is excluded. Accordingly, no excess material has to be deposited for the production of a dental prosthesis part. This raises the fabrication time, enables precise fabrication, reduces the material costs arising and renders a step of removal of the outer non-cured layer unnecessary. Of course, one support material or several, in particular different, support materials can be provided for the method according to the invention. The support material or several support materials can be provided in one or more cartridges.

The ratio of viscosity of the composite material in the non-cured state to the nozzle diameter can lie in the range from 0.033 to 40 Pa*s/µm, preferably 0.5 to 10 Pa*s/µm, especially preferably 0.8 to 5.0 Pa*s/µm. In this manner, blockage of the nozzle is excluded and optimal manageability of the composite material ensured. This reduces the susceptibility to failure, and thus optimizes the production time and reduces the production costs. In general, the viscosity of the composite material in the non-cured state can lie in the range from 10 to 2000 Pa*s. In general, the nozzle diameter can lie in the range from 50 to 300 µm.

A further aspect relates to the use of a cartridge as previously described for the generative production of dental prosthesis, in particular by 3D printing methods.

A further aspect relates to the use of support material as previously described in an additive method, in particular in 3D printing.

A further aspect relates to a kit of parts, in the sense of a system, comprising the component a., the optional component b. and the component c. Component a. comprises a cartridge. In particular, the component a. comprises several cartridges with different composite materials. Here some of the several cartridges differ in color and/or translucency and/or regarding the filler composition, in particular for establishing different mechanical properties or gloss stability. The optimal component b. comprises a support material in particular several support materials. Here some of the several support materials differ in the translucent wavelength ranges and/or the viscosity. The component c. comprises use instructions for the production of dental prosthesis. The optional component b. can further comprise a cartridge which contains the support material or in which the support material is provided.

Composite materials preferred in the context of the invention are as follows:
  A. A dental composite material comprising
    a. a curable, in particular photocurable, matrix,
    b. only fillers with a maximum particle size of <5 µm
    wherein the dental composite material in the non-cured state has a viscosity in the range from 1-10,000 Pa*s, preferably from 10-2,000 Pa*s, especially preferably 50-800 Pa*s, in particular according to determination of the viscosity in the rheometer as described below in the practical examples.

B. The dental composite material as described in A, wherein the material of the matrix comprises monomers selected from the group comprising BisGMA, BisEMA, UDMA, EGDMA, DEGDMA, TEGDMA, TCD-Di-HEA and isobornyl methacrylate.

This selection is not exhaustive and further monomers, in particular acrylate monomers, can certainly be added. These can be mono-, di- or trifunctional, aromatic, cycloaliphatic, heterocyclic, linear or branched.

C. The dental composite material as described in A or B, wherein the fillers are selected from the list
   a. ground dental glass of glass ceramic, wherein particles with a size >5 µm are removed,
   b. ground glass ceramic, wherein particles with a size >5 µm are removed,
   c. spherical silicates with particle sizes in the range from 0.1 to 1 µm,
   d. aggregated nanoparticles, for example pyrogenic silicic acid,
   e. non-aggregated nanoparticles based on $SiO_2$, or based on mixed oxides of Si, Sr, Y, Zr, Nb, Ba, La, Hf, Ta, Yb and Ce, produced by sol-gel methods or flame pyrolysis,
   f. non-agglomerated particles based on ytterbium fluoride.

Nanoparticles cited under e. are for example obtainable from Bayer as Levasil 200A/40%.

D. The dental composite material as described in A, B or C, wherein the filler has a percentage content by weight of the composite material in the range from 20-90 wt. %, preferably 40-80 wt. %, especially preferably 55-75 wt. %.

E. The dental composite material as described in A, B, C or D, wherein the filler contains agglomerated and/or non-agglomerated nanoparticles.

F. The dental composite material as described in A, B, C, D or E comprising photoinitiators selected from the list camphorquinone, acylphosphine oxides such as lucirin TPO, phenylbis(2,4,6-trimethylbenzoyl)phosphine oxide (BAPO) and germanium compounds.

Here the photoinitiators can be matched to the light source on the 3D printer, for example camphorquinone for blue light curing with a radiation maximum in the range from 450 to 470 nm, acylphosphine oxides such as for example lucirin TPO and BAPO for violet/UV curing with a radiation maximum in the range from 380 to 400 nm, and germanium compounds such as DBDEGe. BAPO is for example obtainable from CIBA as Irgacure 819.

G. A method for production of dental composite material, wherein a filler is incorporated into a curable, in particular photocurable, matrix, wherein the maximum particle size of the filler is <5 µm.

H. The method as described in G comprising a fractionation method selected from the list: screening in fluidized bed, wet filtration, sedimentation and centrifugation.

For the wet filtration, distilled water can be used as the solvent. Next, the solvent is reduced by centrifugation. However, the filler does not have to be completely freed from the solvent.

I. A method for the processing of a filler for incorporation into a composite material as described in A to H or for use in a the method as described in F or G comprising the steps
   a. provision of a filler which is free from particles >5 µm, and
   b. removal of particles >5 µm, so that a filler with a maximum particle size of <5 µm is obtained.

If the separation is effected in an aqueous suspension, then the water is mostly removed by centrifugation. For good bonding of resin and filler, the filler can be silanized. A wet silanization is preferred here, since through the omission of the drying no agglomerates of the filler are formed. Additionally as a measure for preventing agglomeration of the filler, ultrasound can be applied during the silanization. The paste from which the dental composite material is producible can be kneaded and homogenized by means of two wing kneaders and/or a triple rolling mill. Since freedom from air is a basic requirement for a stable printing process, the dental composite material is next deaerated. This is effected for example in the wing kneaders and/or in a centrifuge.

PRACTICAL EXAMPLES

The following table shows a first composition of a composite material according to the invention.

| Ba glass 0.2 µm, silanized | 53 wt. % GM27884 NF180 (Schott) |
|---|---|
| Pyrogenic silicic acid | 2 wt. % Aerosil R711 (Degussa) |
| Nano $SiO_2$ | 10 wt. % Levasil 200A/40% (Bayer) |
| BisGMA | 16 wt. % Bisphenol A glycerolate dimethacrylate, 494356 (Sigma Aldrich) |
| BisEMA | 14 wt. % 2.2-bis 4-methacryloxy-ethoxy phenyl propane, Sartomer SR101 (Arkema) |
| TEGEMA | 4 wt. % Triethylene glycol dimethacrylate 261548 (Sigma Aldrich) |
| Initiators and stabilizers | 1 wt. % |

The following table shows a second composition of a composite material according to the invention.

| Ba glass 0.7 µm, silanized | 55 wt. % EG 2738 0.7 (Ferro Corporation) |
|---|---|
| Pyrogenic silicic acid | 2 wt. % Aerosil R711 (Degussa) |
| Nano $SiO_2$ | 10 wt. % Levasil 200A/40% (Bayer) |
| BisGMA | 15 wt. % Bisphenol A glycerolate dimethacrylate, 494356 (Sigma Aldrich) |
| BisEMA | 13 wt. % 2.2-bis 4-methacryloxy-ethoxy phenyl propane, Sartomer SR101 (Arkema) |
| TEGEMA | 4 wt. % Triethylene glycol dimethacrylate 261548 (Sigma Aldrich) |
| Initiators and stabilizers | 1 wt. % |

DETERMINATION OF THE VISCOSITY

In the context of the invention, the viscosity is determined as aforesaid in a StressTech rheometer from ATS RheoSystems. The stability of a material is seen at shear rates of approximately $0.01\ s^{-1}$ to $10\ s^{-1}$. Since such low shear rates are difficult to preset in measurement technology, and with curing materials measurements are made in oscillation mode, the viscosity is determined with a non-destructive deformation (0.01) and at 1 Hz. The measurement system is a flat base plate (plate-plate P15). The measurement is performed at a temperature of 23° C. The gap has a depth of 1 mm. A flow syringe with application needle is used for deposition of the sample. the settings on the StressTech rheometer are stated below:

| Method | oscillation deformation |
|---|---|
| Measurement system | P15 |
| Measurement temperature | 23° C. |
| Control normal force | |
| Loading procedure | method: on gap |
| | max. normal force: 5.00 N |
| Equilibration | measurement start if below 5.65 N |
| | max. duration 1000 s. |
| Sample trimming | inactive |
| Sample height | 1 mm |
| Unit | N |
| Frequency and deformation | |
| Frequency | 1 Hz |
| Delay | 1 s |
| Integration period | 1 |
| Deformation | 0.01 |
| Size | 512 |
| 1$^{st}$ stress | 10 Pa |
| Continuously active | |
| Temperature and time | |
| Preshear | inactive |
| Equilibration time | inactive |
| No. of measurements | 10 |
| Measurement interval | 1 s |
| T according to measurement | manually inputted value |
| Additional functions | |
| Resolution | 4 rad |
| Deformation limit value | 1% |
| Max No. iterations | 5 |
| Previous value is used. | |

Figure 2:
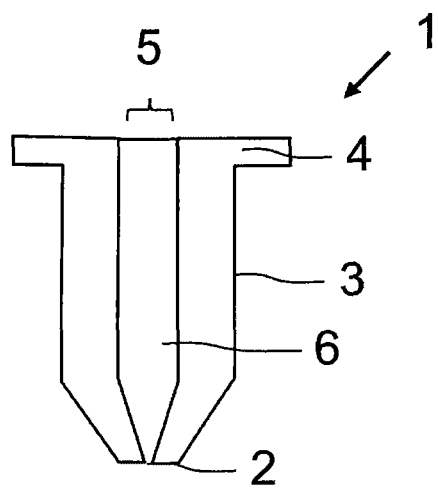
Figure 3:
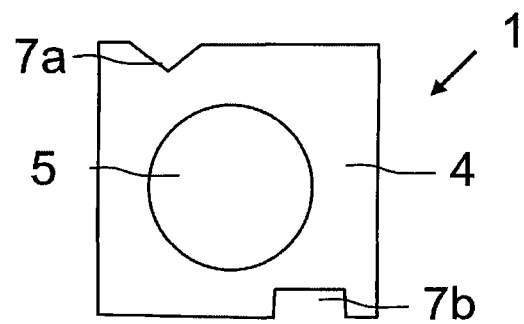
Figure 4:
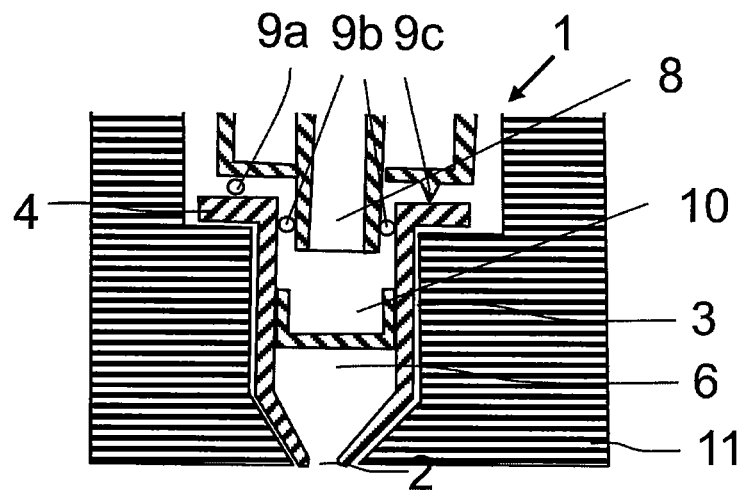

The invention is explained in more detail below on the basis of diagrams. These show:

FIG. 1: A side view of the cartridge according to the invention,

FIG. 2: A vertical section of the cartridge according to the invention,

FIG. 3: A view of the cartridge according to the invention from above,

FIG. 4: A section of a cartridge according to the invention with sealing elements in a 3D printer, FIG. 5: A section of a cartridge according to the invention with a further arrangement of a sealing element, FIG. 6: A section of a cartridge according to the invention with a further arrangement of a sealing element, FIG. 7: A section of a further embodiment of a cartridge according to the invention, and FIG. 8: A further embodiment of a cartridge according to the invention in a side view (FIG. 8a) and in section (FIG. 8b).

FIG. 1 shows a cartridge 1 according to the invention in a side view. The cartridge 1 comprises a nozzle opening 2, a wall 3 and an upper boundary 4. In the lower region, which ends in the nozzle opening 2, the wall 3 is tapered and converges. In the upper region, the wall 3 is cylindrically shaped and thus forms a reservoir for a composite material (compare FIGS. 2 to 4). The upper boundary 4 of the cartridge 1 provides for the electrical contacting of a 3D printer.

FIG. 2 shows a section of a cartridge 1 according to the invention. The cartridge 1 comprises a nozzle opening 2, a wall 3 and an upper boundary 4. The boundary 4 has a recess to accommodate a pressurizing element. The reservoir 6, which is formed by the wall surrounding the recess 6, contains a composite material and a piston (not shown). By means of the recess 5, a pressurizing element which can displace the piston within the cartridge in the direction of the nozzle opening 2 is accommodated by the cartridge. In this manner, the composite material of the reservoir 6 of the cartridge 1 can be released through the nozzle opening 2.

FIG. 3 shows a view of the cartridge according to the invention from above. The upper boundary 4 contains the recess 5 (compare FIG. 2). Furthermore, a first guide 7a and a second guide 7b are shown. The cartridge 1 can of course have only one of the guides shown. By means of the guide 7a and/or the guide 7b, incorrect use of the cartridge 1 in a 3D printer is avoided. Here the guide 7a and/or the guide 7b is positioned into a corresponding counterpart. Therefore if an inserted cartridge does not have the guide matching the 3D printer or the mounting of the cartridge on the 3D printer, then use of the cartridge is excluded. Accordingly, the guide or the guides of the cartridge form an interface for a 3D printer.

FIG. 4 shows a section of a cartridge 1 according to the invention in a 3D printer 11. The sealing elements 9a, 9b and 9c are also shown. The cartridge 1 according to the invention can of course have only one or several of the sealing elements shown. The sealing elements 9a and 9b are O-rings. The sealing element 9a is positioned in the outer region of the cartridge 1 on the upper boundary 4. The sealing element 9b is positioned in an inner region of the cartridge 1 on the wall 3. The sealing elements 9a and 9b form seals between the cartridge 1 and the pressurizing element 8. The sealing element 9c is formed by a welt which is positioned on the pressurizing element 8 and strikes a notch in the material of the cartridge 1. The pressurizing element 9a, 9b and 9c ensure sealing of the cartridge 1 and the pressurizing element 8 against the surroundings. Since the pressurizing element 8 is designed as a compressed air connector, a seal against the surroundings is necessary in order to move the piston 10 in the direction of the nozzle opening 2.

Figure 5:
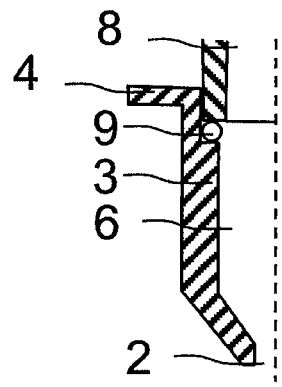
Figure 6:
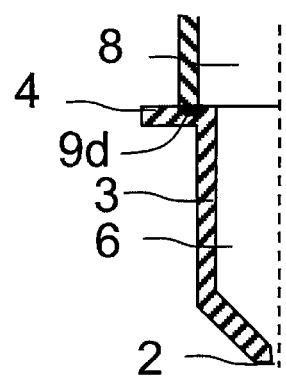

FIGS. 5 and 6 show further embodiments of the sealing element 9 and 9d of the cartridge 1. Vertical sections of the cartridge 1 are shown. For simplified representation, only one half of the sectioned cartridge 1 is shown in each. The sealing element 9 of the cartridge 1 in FIG. 5 is an O-ring which is positioned on a skirting ledge of the wall 3 in the inside of the cartridge 1. The pressurizing element 8, which is a compressed air connector, presses on the O-ring, which, since it is held in position by the skirting ledge located in the wall 3, is clamped between skirting ledge and connector. The sealing effect obtained is correspondingly efficient. FIG. 6 shows an alternative embodiment of a sealing element 9d, which is located in the outer region of the cartridge 1 on the upper boundary 4. The corresponding site has elastic material properties. The pressurizing element 8 in the form of a compressed air connector impinges on the elastic site and presses this in so that a sealing effect is ensured.

Figure 7:
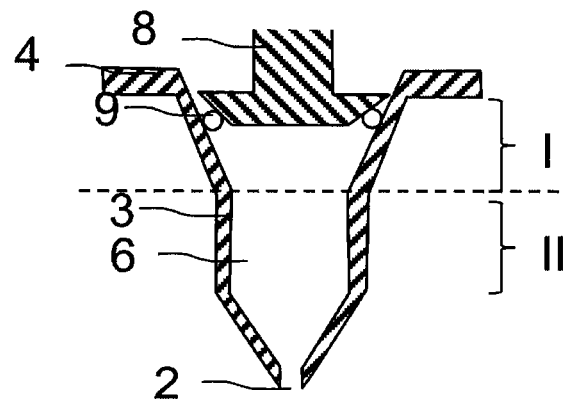

FIG. 7 shows a vertical section of a cartridge 1 according to the invention. The cartridge 1 has two regions I and II of the wall 3. An upper first region I, in which a sealing element in the form of an O-ring is positioned. The first region I is tapered. In the first region I, a pressurizing element 8 in the form of a compressed air connector impinges on the sealing element 9. Accordingly, a sealing action against the surroundings is obtained. A second lower region II of the wall 3 is cylindrically shaped and serves as a reservoir in which composite material is situated (not shown). The cylindrical design enables displacement of a piston (not shown; compare FIG. 4) by means of a compressed air connector in the second lower region II of the cartridge 1 in the direction of the nozzle opening 2, as a result of which composite material can be released through the nozzle opening 2.

Figure 8A:
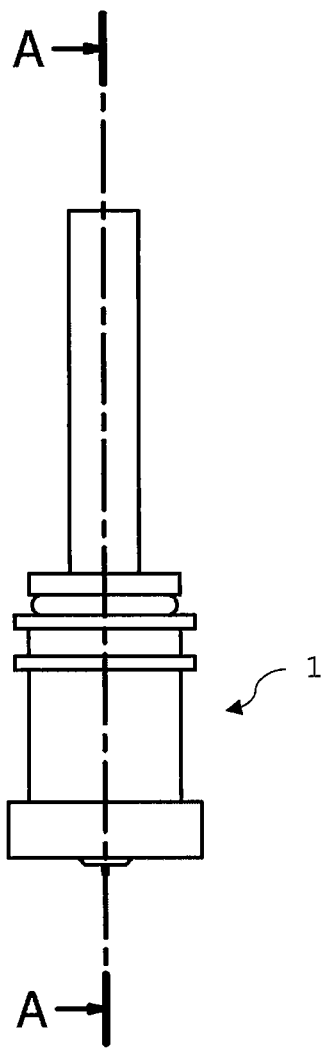
Figure 8B:
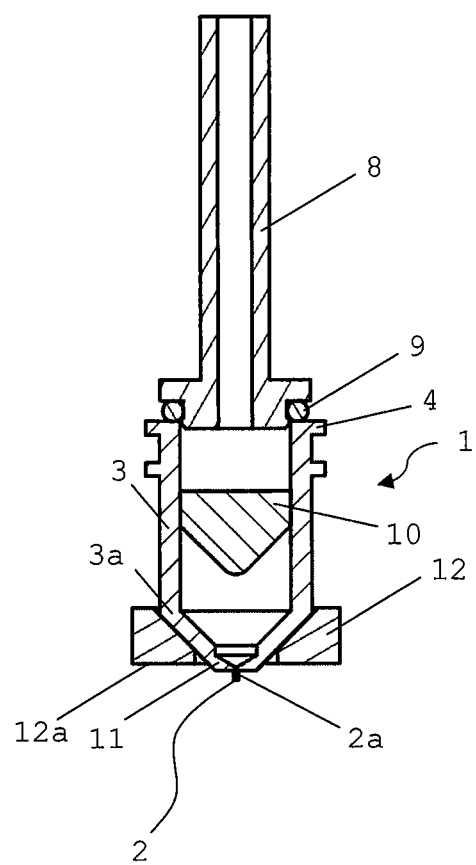

FIG. 8a shows a further embodiment of a cartridge 1 according to the invention (the longitudinal axis of the cartridge is indicated by A-A); FIG. 8b shows this cartridge 1 in a sectional representation. In this embodiment, the nozzle opening 2 is positioned at the lower end of a nozzle 2a shaped as a cylindrical hollow cannula, wherein the nozzle projects from the cartridge body formed by the wall 3 and is e.g. tightly inserted or glued into this. Such an arrangement advantageously avoids smearing of adjacently deposited material strands and undesired accumulation of material on the nozzle opening 2.

The cartridge according to FIG. 8a/b further has a positioning device which is formed by a truncated cone-shaped end section 3a of the cartridge body and a stop element 12 with a corresponding conical inner contour surrounding a part of the end section 3 in the form of a collar. In this, a lower part of the truncated cone-shaped end section 3a projects out of the stop element and thus forms a truncated cone-shaped centering element 11 for the defined mounting in the 3D printer. A defined and narrow tolerance distance between the lower boundary 12a of the stop element 12 and the nozzle opening 2a ensures a defined and reproducible position of the nozzle opening 2. Corresponding to the truncated cone-shaped end section 3a, the piston 10 here also has region with a corresponding shape in order to ensure as complete as possible ejection from or emptying of the cartridge 1.

The nozzle configuration shown in FIG. 8a/b and the positioning device are functionally independent and can be present singly or together. Likewise, combination with further elements of other embodiments, in particular guides, is possible.

Several cartridges for several materials, e.g. dentine composite material, enamel composite material and support material, can be designed in essentially the same manner, wherein the actual geometries of cartridge and nozzle can be the same or different depending on material and flow properties. Similarly, a corresponding mounting or a printing head of the 3D printer can be designed for simultaneous mounting of several cartridges. If the cartridges are provided with guides, as explained in connection with FIG. 3, cartridges with different materials, e.g. dentine composite material, enamel composite material and support material, and the corresponding mounting or mountings of the 3D printer have different guide devices in order to ensure correct insertion of the cartridges with different materials at the appropriate positions. In contrast, cartridges with alternatively usable materials, e.g. composite materials of different coloring and/or translucency advantageously have identical guides.

The invention claimed is:

1. A cartridge for a 3D printer, wherein the cartridge has a nozzle and the cartridge contains a dental composite material, wherein the nozzle comprises a cylindrical end region with a length from 1 to 30 times of an internal nozzle diameter at an outlet and the composite material comprises:
   a. a curable matrix, and
   b. only fillers with a maximal particle size of <5 μm,
   and the composite material has a viscosity, in a non-cured state, in a range of from 1 to 10,000 Pa*s,
   wherein the ratio of viscosity of the composite material in the non-cured state to the nozzle diameter is in a range between 0.033 to 40 Pa*s/μm.

2. The cartridge according to claim 1, wherein a size ratio of the nozzle diameter of the cartridge to a greatest particle size of the composite material is 10:1.

3. The cartridge according to claim 1, having a piston for displacing the composite material through the nozzle out of the cartridge.

4. The cartridge according to claim 1, wherein a sieve is positioned in the cartridge, before the outlet of the nozzle, through which the composite material passes during displacement from the cartridge.

5. The cartridge according to claim 1, wherein the cartridge is designed such that the nozzle is formed by cutting or by puncturing.

6. The cartridge according to claim 1, having at least one sealing element, wherein the sealing element is designed such that the cartridge is sealable against a pressurizing element, positionable on the cartridge, for displacement of the composite material.

7. The cartridge according to claim 6, wherein said at least one sealing element is positioned on an outer region of the cartridge or in an inner region of the cartridge above the pressurizing element, which borders on a reservoir region, and the reservoir region contains the composite material.

8. The cartridge according to claim 1, wherein the cartridge has a thermal conductivity from 0.1 to 400 W/mK.

* * * * *